United States Patent Office 2,943,938
Patented July 5, 1960

2,943,938
GIBBERELLIN IN ANIMAL FEEDS

John R. De Zeeuw, Gerald A. Donovan, and William C. Sherman, Terre Haute, Ind., assignors to Chas. Pfizer & Co., Inc., New York, N.Y., a corporation of Delaware No Drawing. Filed Feb. 6, 1958, Ser. No. 713,560

3 Claims. (Cl. 99—2)

This invention relates to improved animal feeds as well as to a new method for markedly improving the growth of animals, particularly poultry. It is especially concerned with nutritionally balanced animal feed compositions containing gibberellin.

In the past, it has been reported that various antibiotic hormones and chemotherapeutic agents are useful for stimulating the growth of domestic animals, such as poultry, lambs, cattle, swine, and the like. Thus, such animals are able to attain market size sooner and on less feed. Furthermore, the incidence of disease is greatly reduced and there are few runts or subpar animals to cull out. Hence, this method has proven to be of sufficient value so that several of these aforementioned growth-promoters are widely used for agricultural purposes. In accordance with the prior art, penicillin and stilbestrol are among the more widely known agents used for stimulating the growth of poultry. It has been observed in recent years that the degree of response of poultry to these aforementioned growth-promoters is not as favorable now as it was when much of the work in this field was originally performed. It has been speculated that this is due not to a failure of these agents to have an effect on the animals' growth, but rather that the effect is due to the absence of microorganisms in the environment of the control animals as the latter tend to suppress, to some extent, the full growth of these animals. This may be due to a greater practice of sanitary techniques in recent years and also to the continued use of antibiotic products in animal feeds.

In accordance with the present invention, it has now been found that animal feeds containing nutritional levels of gibberellin, a non-antibiotic material, elicit a substantially greater growth increase and feed efficiency response in animals than that exhibited by the majority of antibiotics now commercially available. In particular, it affords a substantially greater response than that elicited by penicillin, which as indicated above, is considered to be one of the best antibiotics for use in poultry. Gibberellin is a plant-growth promoter which is produced by fermenting a nutrient medium with *Gibberella fujikuroi*. When applied in smaller amounts to some plants, gibberellin will cause growth to occur several times faster than that expected in the case of untreated plants. Gibberellin is defined as a mixture comprising three different and distinct chemical compounds, viz., gibberellin $A_1$, gibberellin $A_2$, and gibberellin $A_3$ (gibberellin X or gibberellic acid), although the term gibberellin may also be applied to any one of the individual components. At the present time, only gibberellic acid has been thoroughly characterized as to its chemical structure. These compounds are all formed in the filtrates of *G. fujikuroi*, and they all apparently act in the same way regarding their ability to stimulate certain plants to grow two to three times their normal height. Furthermore, they may also induce earlier flowering and speed germination, in addition to having a reverse effect on dwarfism. The true nature of the herein described activity of the compounds of this invention, i.e., the fact that the gibberellins should bring about a greater rate of growth in poultry than does, for instance, penicillin, is not understood.

It should be noted that where reference is made to gibberellin herein, the term is intended to include the aforementioned gibberellin $A_1$, gibberellin $A_2$ (a mixture of the latter two compounds is sometimes referred to as gibberellin A), and gibberellin $A_3$ (gibberellin X or gibberellic acid); any one of these substances may be individually employed as well as mixtures thereof, such as the aforesaid fermentation product (gibberellin A and gibberellin X). It is also intended to include within this term various biologically active derivatives of gibberellic acid; for example, alkali metal salts, such as the monosodium, monopotassium and monolithium salts, and lower alkyl esters thereof wherein the alkyl group has from one to eight carbon atoms, such as the methyl ester, ethyl ester, isopropyl ester, and the like. Furthermore, gibberellin may be used in animal feeds either alone or in conjunction with various antibiotics and chemotherapeutic agents, such as penicillin, chlortetracycline, oxytetracycline, tetracycline, bacitracin, sulfaquinoxaline, phenylarsonic acid, oleandomycin, etc.

In accordance with the process of this invention, a level of as low as 0.001 mg. of gibberellin per kg. of animal feed affords a response in animals that is substantially greater than that afforded by the use of two hundred times the amount of penicillin. In general, gibberellin may be used in animal feeds at a concentration level of from about 0.0001 mg. to about 10 mg. per kg. in order to obtain the unusually high degree of response in growth promotion. Although some effect may be obtained by using less than 0.0001 mg. per kg. of feed, it may be variable and it is advisable not to use appreciably lesser amounts. The preferred proportion is a concentration level in the range of from about 0.01 mg. to about 1.0 mg. of gibberellin per kg. of animal feed, although this will vary somewhat with the weight of the animal being tested; in general, about 0.0008 mg. to about 0.13 mg. per kg. of animal body weight per day is usually employed.

The herein described feeds of this invention have been found to be particularly valuable and outstanding in the case of such animals as chickens, turkeys, ducks, hogs, swine, lambs, cattle, and the like; in some instances, the degree of response may vary with respect to the sex of the animals. Gibberellin may, of course, be administered in one component of the feed or it may be blended uniformly throughout a mixed feed; alternatively, it may be administered in an equivalent amount via the animal's water ration. It should be noted that a variety of feed components may be of use in the nutritional diets. A type of conventional feed material in the case of poultry, which is often preferred in the operation of this invention, is one which follows generally the suggested formulae set forth on page six of the authoritative pamphlet issued by the National Research Council (Washington, D.C., June 1944) and entitled "Recommended Nutrient Allowance for Poultry." For instance, feed compositions are recommended to contain roughly between 50% and 80% of grains, between 3% and 10% of animal protein, between 5% and 30% of vegetable protein, and between 2% and 4% of minerals, together with supplementary vitaminaceous sources.

In accordance with a specific embodiment of this invention, it has been found that in a chick battery trial of four weeks' duration, the addition of gibberellin to the feed at levels of from 0.0001 mg. to 10 mg. per kg.

afforded growth responses ranging from 1% to 6% over control values. Furthermore, the addition of gibberellin to the feed at a level of 0.1 mg. per kg. afforded growth and feed efficiency responses that were at least three times the magnitude obtained with procaine penicillin at a concentration level of 5.5 mg./kg. Finally, these responses to gibberellin concentration levels in the range of 0.01–1.0 mg./kg. are often as great as those obtained with higher concentration levels of the same substance.

This invention is further illustrated by the following examples, which are not to be considered as imposing any limitations on the scope thereof.

*Example I*

The gibberellin used in this example as well as in the foregoing examples was prepared in accordance with the procedure described by Stodola et. al., in the Archives of Biochemistry and Biophysics, vol. 54, pp. 240–245 (1955), and it was isolated by extracting at room temperature the resulting fermentation broth with methyl ethyl ketone using a Podbielniak centrifugal extractor, concentrating the extract under reduced pressure to precipitate non-gibberellin materials, and further reducing the extract to precipitate pure crystalline gibberellins. The gibberellin so obtained is actually a multicomponent mixture comprising the following individual components, based on counter-current distribution as well as on paper and column chromatography studies: 70% gibberellic acid (gibberellin X or gibberellin $A_3$) and about 20% gibberellin A (gibberellin $A_1$ and $A_2$); the remaining 5–10% consists of less active materials.

The growth experiments with gibberellin were conducted on Nichol's White-Cross Chicks kept in electrically heated brooders on raised wire floors. The day old chicks were divided into lots of five males and five females per compartment, replicated four times per treatment. The basal diet employed is shown below in the following table:

Ingredients: Diet (lbs.)
- Ground yellow corn _____ 50.78
- Solvated soybean meal (51%) _____ 38.15
- Corn oil _____ 6.10
- Sodium chloride _____ 0.61
- Calcium carbonate _____ 1.40
- Calcium phosphate, dibasic _____ 1.35
- Sodium phosphate, monobasic _____ 0.46
- Vigofac [1] _____ 0.30
- DL-methionine _____ 0.140
- Vitamin A (10,000 I.U./g.) _____ 0.10
- Vitamin $B_{12}$ (9 mg./lb.) _____ 0.050
- Vitamin $D_3$ (3,000 I.C.U./g.) _____ 0.05
- Riboflavin (4 gm./lb.) _____ 0.06
- DL-calcium pantothenate (45%) _____ 0.002
- Pyridoxine hydrochloride _____ 0.0006
- Niacin, U.S.P. _____ 0.0025
- Choline chloride 25% _____ 0.20
- Butylated hydroxyanisole _____ 0.0125
- Delamix [2] _____ 0.10

[1] Vigofac is the registered trademark of Chas. Pfizer & Co., Inc. for unidentified poultry and livestock growth factors obtainable from Streptomyces fermentation sources.
[2] Delamix is the trademark name for a trace mineral premix manufactured by The Limestone Products Corporation of America, Newton, N.J., and having the following composition:

Ingredients: Percent
- Manganese _____ 6.0
- Iodine _____ 0.1
- Iron _____ 2.0
- Copper _____ 0.2
- Zinc _____ 0.006
- Cobalt _____ 0.02
- or Boron _____ 0.008
- Calcium _____ 26.5
- Magnesium _____ 1.9

Gibberellin was then added to the diet in premix form at the expense of the yellow corn meal. The birds were individually weighed and records of feed consumption by lot were maintained. The results obtained are presented in the following table:

| Supplement | 28-day Weight (g.) | Growth Index | Feed Efficiency |
|---|---|---|---|
| Control | 494 | 100 | 146 |
| Gibberellin, 0.0001 mg./kg | 495 | 100.2 | 143 |
| Gibberellin, 0.001 mg./kg | 524 | 106.1 | 144 |
| Gibberellin, 0.01 mg./kg | 501 | 101.4 | 146 |
| Gibberellin, 0.1 mg./kg | 519 | 105.1 | 143 |
| Gibberellin, 1.0 mg./kg | 505 | 102.2 | 146 |
| Gibberellin, 10.0 mg./kg | 516 | 104.5 | 144 |
| Penicillin, 5.5 mg./kg | 502 | 101.6 | 144 |

*Example II*

The same procedure as described in Example I was followed here except that Vantress Cross Chicks were the particular animals employed. These chicks were all one day of age and they included members of both sexes; four replicates of ten chicks each were used in all the treatments. The four week results are presented in the following table:

| Supplement | 28-day Weight (g.) | Growth Index | Feed Efficiency |
|---|---|---|---|
| Control | 450 | 100 | 1.59 |
| Gibberellin, 0.0001 mg./kg | 456 | 101.3 | 1.57 |
| Gibberellin, 0.001 mg./kg | 464 | 103.1 | 1.57 |
| Gibberellin, 0.01 mg./kg | 471 | 104.6 | 1.60 |
| Gibberellin, 0.1 mg./kg | 461 | 102.2 | 1.60 |
| Gibberellin, 1.0 mg./kg | 459 | 102.2 | 1.58 |

*Example III*

Wether lambs were treated with nutritionally balanced animal feed compositions containing gibberellin at the level of one gram per ton. The lambs were divided into groups of twelve and each group was replicated twice per treatment. The basal diet employed is presented in the following table:

Ingredients: Diets (lbs.)
- Chopped alfalfa hay _____ 35
- Cane molasses _____ 10
- Ground yellow corn _____ 53
- Urea _____ 1
- Bone meal (⅜" pellets) _____ 1

Gibberellin was then added to the above ration at the level of one gram per ton. At the end of sixty days, the following results were obtained:

| | No. of Lambs (Wethers) | Av. Daily Gains (lbs.) | Lbs. Feed/ Lbs. Gain |
|---|---|---|---|
| Control | 24 | 0.536 | 6.53 |
| Gibberellic Acid (lg./ton) | 12 | 0.622 | 5.98 |
| Percent Response over control | | 16.0 | 8.50 |

*Example IV*

Maryland Medium White Turkey poults were treated in the manner of the previous examples with a nutritionally balanced diet containing gibberellin at a concentration level of 10 mg. per kg. of feed. The basal diet employed is presented in the following table:

| Ingredients: | Diet (lbs.) |
|---|---|
| Fine ground yellow corn | 56.48 |
| 44% solvated soybean meal | 26.94 |
| Corn gluten meal | 2.50 |
| Alfalfa meal, 17% dehydrated | 2.00 |
| Stabilized animal fat | 1.50 |
| Fish meal | 4.00 |
| Dried corn distillers' solubles | 1.00 |
| Dried whey (50% delactosed) | 1.00 |
| Dried brewers' yeast | 1.50 |
| Iodized salt | 0.40 |
| Calcium carbonate | 1.30 |
| Calcium phosphate | 1.00 |
| Delamix | 0.10 |
| DL-methionine | 0.01 |
| Vitamin A (10,000 I.U./g.) | 0.05 |
| Vitamin $B_{12}$ (9 mg./lb.) | 0.020 |
| Vitamin $D_3$ (3,000 I.C.U./g.) | 0.025 |
| Riboflavin (4 gm./lb.) | 0.05 |
| DL-calcium pantothenate 45% | 0.001 |
| Niacin | 0.001 |
| Choline chloride 25% | 0.125 |

At the end of two weeks, it was found that the average weight of the turkeys was substantially higher than the average weight of the birds in the control group.

Hence, this invention provides new and useful animal feed compositions containing gibberellin which afford a truly remarkable magnitude of growth response in view of the difficulties usually encountered in obtaining responses to growth promoters under battery conditions.

What is claimed is:

1. Animal feed compositions comprising a nutritionally-balanced animal feed and a small, growth-promoting portion of gibberellin.

2. An animal feed composition comprising a nutritionally-balanced animal feed containing gibberellin at a concentration level in the range of from about 0.0001 mg. to about 10 mg. per kg. of feed.

3. A process for increasing growth and improving feed efficiency in animals, which comprises orally administering thereto a small, growth-promoting portion of gibberellin.

References Cited in the file of this patent

UNITED STATES PATENTS 2,842,051    Brian et al. _____ July 8, 1958